Nov. 15, 1960 G. A. BRILLINGER 2,960,591
TOOL FOR MELTING AND REMOVING FUSIBLE MATERIAL
Filed Oct. 21, 1958 2 Sheets-Sheet 1
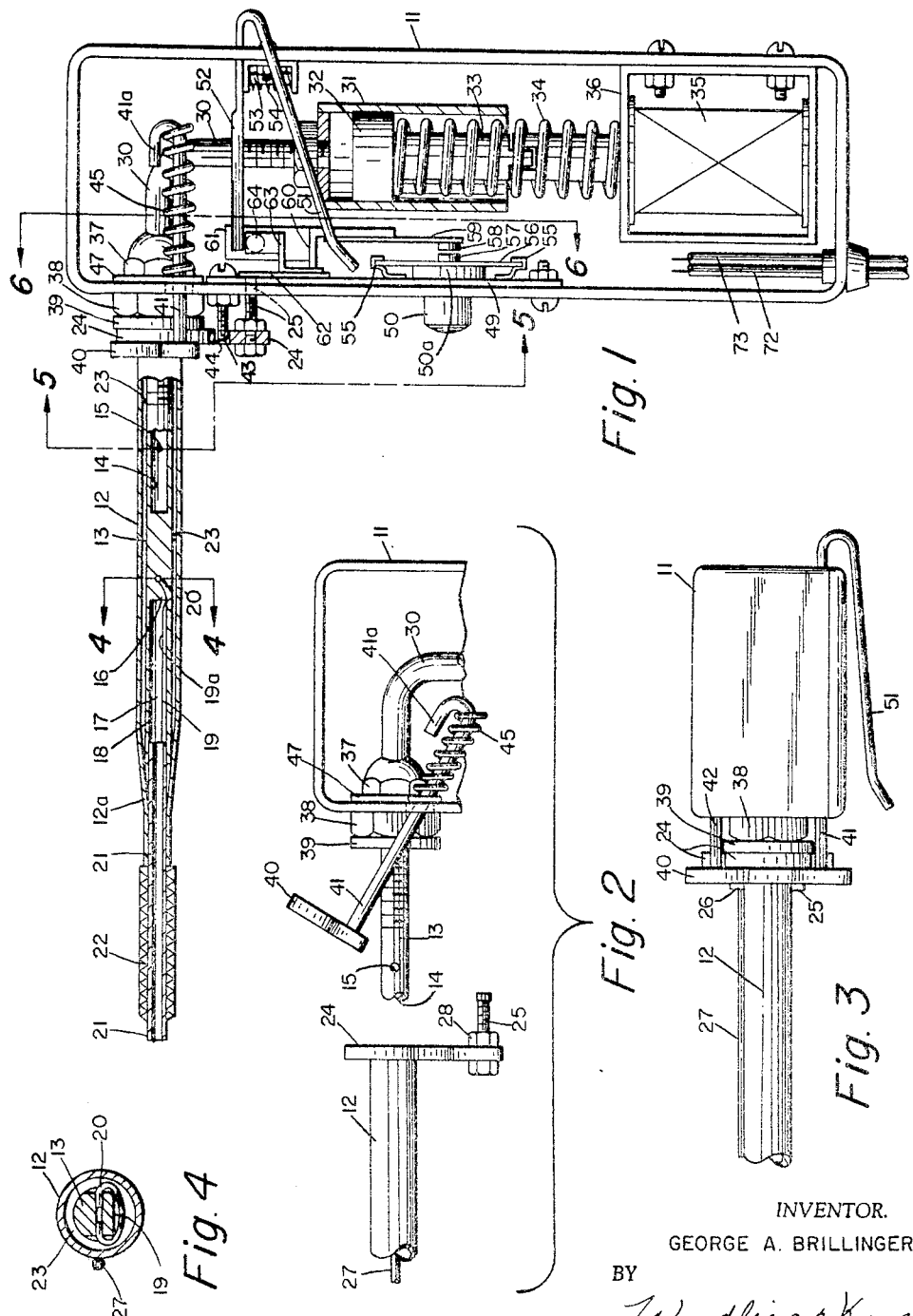
INVENTOR.
GEORGE A. BRILLINGER
BY
Woodling & Krost
ATTORNEYS Nov. 15, 1960   G. A. BRILLINGER   2,960,591
TOOL FOR MELTING AND REMOVING FUSIBLE MATERIAL
Filed Oct. 21, 1958   2 Sheets-Sheet 2

INVENTOR.
GEORGE A. BRILLINGER
BY
*Woodling & Krost*
ATTORNEYS

United States Patent Office 2,960,591
Patented Nov. 15, 1960

2,960,591
TOOL FOR MELTING AND REMOVING FUSIBLE MATERIAL

George A. Brillinger, 21960 Lorain Road, Fairview Park 26, Ohio, assignor of one-half to Bruce B. Krost Filed Oct. 21, 1958, Ser. No. 768,781

8 Claims. (Cl. 219—21)

My invention relates to tools for melting and removing fusible material.

An object of my invention is to provide an improved tool which may be used for melting fusible material, such as metal, in the usual soldering operation and also used for melting such metal and the removal of the molten metal.

Another object is the provision of an improved tool for removing solder from a soldered connection, such as between a terminal clip and a wire.

In the reconstruction and repair of many electrical appliances and devices, it is often necessary to remove components which are electrically connected by solder to electric conductors. If the body of solder at the connection is merely melted, it sometimes drops down into other parts of the appliance to cause electrical short-circuits or other undesirable results. Attempts are sometimes made to pick the mass of solder from the connection but this is difficult and very often impossible to do without injury to the parts or without leaving an undesired residue of solder at the connection.

My tool can be used alone as an ordinary soldering tool for melting solder at the location of a connection to leave the usual solder body at the connection between a terminal clip, for example, and a conductor, such as a wire. My tool may also be used, and has its most important utility, in the removal of a mass or body of solid solder at the electrical connection between two elements. In such a use, my tool first melts the metal and then by manipulation of the actuating mechanism of the tool, removes the solder while in a molten state from the connection to leave the element of the connection free and clear of the solder so that the elements, such as a terminal clip and a wire, may be quickly and easily separated.

It is an object of this invention to provide an efficient and useful tool for accomplishing the foregoing results.

Another object is the provision of a tool of this character and having improved construction and operating characteristics.

Another object is the provision of an improvement of the device shown and described in my United States Patent No. 2,826,667, issued March 11, 1958.

Another object is to provide an improved tool producing results not heretofore readily obtainable.

Other objects and a better understanding of my invention may be had by referring to the following description and claims, taken in conjunction with the accompany drawings in which:

Figure 1 is a longitudinal sectional view of a tool embodying my invention;

Figure 2 is an enlarged view of a portion of my device in disassembled condition;

Figure 3 is a plan view of a portion of my device and showing the parts illustrated in Figure 2 in an assembled condition;

Figure 4 is an enlarged cross-sectional view taken through the line 4—4 of Figure 1;

Figure 7:
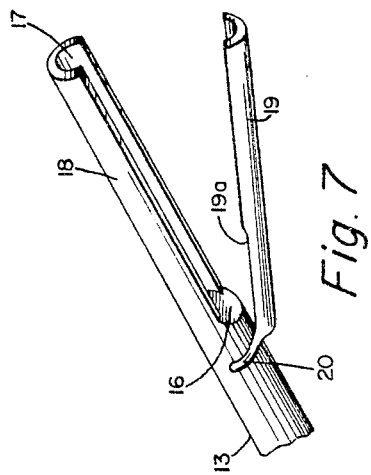
Figure 7 is an enlarged perspective view of a portion of my device used for entrapping molten fusible material.

My tool has a casing 11 which provides a pistol grip for the tool. Mounted to the forward end of the casing 11 is a hollow tubular member 12 which extends therefrom as does the barrel of a gun. The forward end of the hollow tubular member 12 is tapered inwardly to provide the forward tapered portion 12–a. The smaller tube 21 is mounted to the forward end of the tubular member 12 so as to be tightly held in the forward tapered portion 12–a and to extend forwardly therefrom. Disposed around the forward tube 21 adjacent to the forward end thereof is an electrical heating element 22, including electrical resistance wires so disposed as to heat the forward end of the tube 21 upon energization of the heating element 22.

Concentrically mounted within the tubular member 12 is an inner member 13 so disposed as to leave an annular passageway 23 between the inner wall of the tubular member 12 and the outer wall of the member 13. The forward end of the member 13 abuts against the rearward end of the tube 21 as seen in Figure 1. The inner member 13 is permanently carried by the casing 11 so as to protrude therefrom as shown in Figure 2, whereas the tubular member 12 is detachably mounted to the casing 11. The member 13 has a bore 14 in its rearward portion which bore 14 communicates with the inner bore in a tube 30 in the casing. To provide communication between the passageway 23 and the bore 14, there are two axially disposed openings 15 in the wall of the member 13. Forwardly of the bore 14 in the inner member 13, there is a solid wall 16. In advance of the solid wall 16, there is a forward chamber 17, this chamber 17 being open at its forward end and in direct communication and in alignment with the bore of the tube 21.

One of the side walls of the chamber 17 is provided by the fixed portion 18 of the member 13. The other and opposed wall of the chamber 17 is a movable wall element 19 which is hingedly carried by the hinge connection 20 to the inner member 13 as illustrated in Figures 1 and 7. The hinged wall portion 19 is slotted on each side and adjacent the hinge 20 to provide the opposite slots 19–a. These slots 19–a provide vents or openings between the forward chamber 17 and the passageway 23. Thus air entering through the forward end of the tube 21 may move through the chamber 17, out through the vents 19–a, through the passageway 23, through the openings 15, and hence through the bore 14 and out through the inner bore of the tube 30.

A pneumatic cylinder 31 is attached to and communicates with the tube 30. Air drawn into the cylinder 31 enters the cylinder from the tube 30 through the end wall of the cylinder 31.

A piston 32 in close sliding engagement with the inner wall of the cylinder 31 is mounted so that reciprocation of the piston 32 in a retracting direction causes air to be drawn or sucked into the cylinder 31. By reason of the above described intercommunicating bores, vents, passageways, opening, and innerbores, air is drawn or sucked inwardly of the tool from the open forward end thereof on retracting movement of the piston 32, which in Figure 1 is in a downward direction. The cylinder 31 is open or vented at the lower end beneath the piston 32 to permit the displacement of the air from the lower part of the cylinder as the piston retracts.

A piston stem 33 connected to the piston 32 is connected to the movable part of an electric solenoid 35. The piston stem 33 may be articulated as shown to facilitate the assembly and movement of the parts. A coil spring 34 around the stem 33 and abutted against the piston 32 at one end and against the bracket 36 at the other end resiliently biases the piston 32 to one forward position, that is; in an upward direction in Figure 1. The bracket member 36 supports and hold the electric solenoid 35 in position within the casing 11.

Mounted to the rearward end of the tubular member 12, there is an abutting plate 24 which has an opening therein for accommodating the tubular member 12 and to permit the inner member 13 to be concentrically mounted within the tubular member 12. The abutting plate 24 has a pair of prongs 25 and 26 disposed parallel to each other and extending from the lower portion of the plate 24. Nuts 28 threadably secured to the prongs 25 and 26 hold the prongs to the plate 24 and permit the adjustment of the amount of protrusion of the prongs 25 and 26 from the plate 24. One of the prongs, such as prong 26, is electrically connected through an insulated wire 27 with the heating element 22, the insulated wire 27 being carried by the plate 24 and by the tubular member 12. The other prong 25 is grounded to the plate 24 and hence to the tubular member 12, which tubular member 12 at the forward end thereof is connected to one end of the electrical circuit comprising the heating element 22. As the prong 25, plate 24, and tubular member 12 are metal, they are electrically conducting material and thus provide one of the electrical leads for the electrical heating element 22.

A metal reinforcing plate 47 is mounted on the inner wall of the casing 11 adjacent its upper end and a nut 37 holds the hollow tube 30 to the reinforcing plate 47 and to the wall of the casing 11. On the outside of the casing 11 and in actual alignment with the nut 37, there is a nut 38. The nuts 37 and 38 firmly hold the plate 47 and wall of the casing 11 therebetween and the tube 30 and inner member 13 join and intercommunicate through the aligned nut 38, wall of casing 11, opening in plate 47, and nut 37. An annular sealing gasket 39 made of rubber is mounted on the inner member 13 next adjacent the nut 38.

A yoke member 40 is carried by a pair of arms 41 and 42 which in turn extend through provided openings in the wall of the casing 11 and of the reinforcing plate 47 so as to extend within the casing 11. The inner ends of the arms 41 and 42 are bent or crooked to form the portions 41–a and 42–a, respectively.

Coil springs 45 and 46 are mounted around the respective arms 41 and 46 within the casing 11 and abut against the inner wall of the casing 11 and against the bent portions 41–a and 42–a. The bias of the springs 45 and 46 are such as to urge the arms 41 and 42 inwardly of the casing and hence to resiliently urge the yoke member 40 backwardly toward the casing 11. The openings in the casing 11 through which the arms 41 and 42 extend are sufficiently large as to permit the tilting of the arms 41, such as to the position illustrated in Figure 2.

To facilitate the proper alignment of the plate 24 with the casing 11, there is provided an aligning pin 43 protruding forwardly from the casing 11 at a location below the arms 41 and 42 and intermediate the side walls of the casing 11. This aligning pin 43 slidably fits in an opening 44 in the plate 24 and thus retains the plate 24 in proper alignment when coupled with the casing 11.

Another reinforcing plate 49 is mounted by welding or other suitable means to the inner wall of the casing 11 at a location below that of the reinforcing plate 47. A pair of brackets 55 bolted to the reinforcing plate 49 and the casing 11 by nut and bolt assemblies 48 carry a spring plate member 56. This spring plate member 56 has a resiliently flexible portion which may be moved out of its normal plane by the pressure of a finger button 50 extending through an opening of the wall of the casing 11. This finger button 50 has an enlarged portion 50–a disposed inwardly of the casing 11 so as to prevent the complete withdrawal of the finger button 50 from the casing. The large head 50–a engages the resilient portion of the spring plate member 56 so that upon the finger button 50 being moved inwardly by the finger of an operator grasping the casing 11, an electrical contact member 57 carried by the spring plate member 56 is moved inwardly of the casing, that is, to the right in Figure 1.

An opposite electrical contact member 58 is carried by a leaf spring 59 and in electrical connection therewith. This leaf spring 59 is connected by a metal bracket 60 which also carries an upwardly extending leaf spring 61. The leaf spring 61 is resiliently flexible and carries thereon a movable contact element 65 which extends through an opening in the leaf spring 61 to protrude from opposite sides thereof.

A pair of contact plates 62 and 68 are so mounted within the casing 11 as to be engageable by the end of the prongs 25 and 26, respectively, as they protrude through aligned openings in the wall of the casing 11 and of the reinforcing plate 49. These contact plates 62 and 68 are resilient adjacent their upper ends so as to press forwardly of the casing and to maintain a good electrical contact with the prongs 25 and 26 when the prongs are moved rearwardly through the openings into the casing 11.

Another angle bracket 67 carries a fixed contact element 66 upon the other side of the movable contact element 65 carried by the leaf spring 61. The spacing between the contact elements 64, 65, and 66 is such that when the element 65 is in electrical contact with the contact element 64, then it is out of electrical contact with the element 66. Conversely, when the element 65 is in electrical contact with the element 66, it is out of contact with the element 64. Thus movement of the leaf spring 61 places the contact element 65 in electrical contact either with the element 64 or the element 66.

Figure 6:
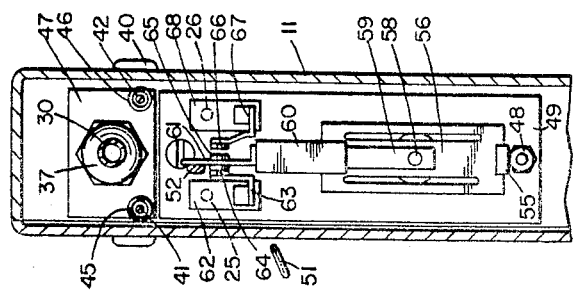
Figure 6 is a partial sectional view of the device shown in Figure 1 and looking in the direction of the arrows of 6—6 of Figure 1.
Figure 5:
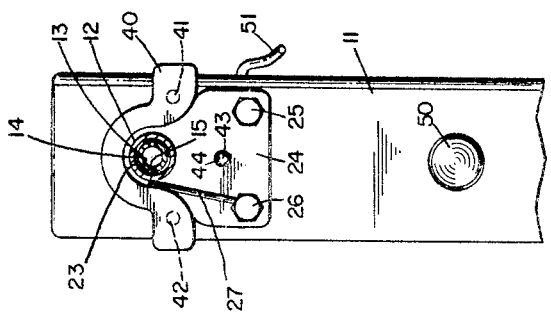
Figure 5 is a partial view of the device shown in Figure 1 and looking in the direction of the arrows of 5—5 of Figure 1.

For moving the leaf spring 61 and hence the movable contact element 65 carried thereby, there is carried a switch engaging arm 52 which extends through the rear wall of the casing 11 and hence is bent forwardly at an angle along the side of the casing 11 to provide a thumb engaging arm portion 51. The arm 52 is pivotally carried on a pivot pin 53 which is pivotally mounted on the inner wall of the casing 11 and which is pivotally biased in one direction by a spring 54 suitably mounted around the pivot pin 53. The bias of the spring 53 is such as to swing the forward end of the arm 52 to the position illustrated in Figure 6. The resilient bias of the leaf spring 61 is such as to resiliently urge the movable contact element 65 in electrical contact with the fixed contact element 64. However, by the operator's thumb pressing the forward end of the arm 51, the arm 52 within the casing 11 is swung on the pivot end 53 so as to move the movable contact element 65 against the bias of the leaf spring 61 over to place the contact element 65 in electrical contact with the fixed element 66 and out of contact with the fixed element 64.

Figure 8:
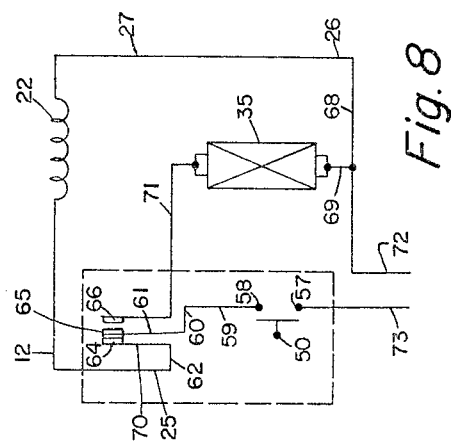
Figure 8 is a diagrammatic view illustrating the electrical circuit utilized with my tool.

Extending through the casing 11 at the lower end thereof are a pair of electrical leads or wires 72 and 73. The leads or wires 72 and 73 are adapted to be connected to a suitable source of electrical energy. The electrical energy supplied through the electrical connecting means introduced into the casing by the leads 72 and 73 is illustrated diagrammatically in Figure 8. The lead 73 connects to contact element 57 and by the finger of the operator pressing the switch button 50 the contact elements 57 and 58 are interconnected. The contact element 58 is electrically connected through the metal leaf spring 59 to the metal bracket 60, which in turn connects with the metal leaf spring 61. With the movable contact element shown in the position of Figures 6 and 8, there is electrical connection provided between the leaf spring 61 and electrical lead connection 70 through the inter-engaged contact elements 65 and 64. This electrical lead or connection 70 is in electrical contact with the metal electrical contact plate 62, which in turn is in electrical contact with the metal prong 25. The metal prong 25 is in electrical connection through the metal tubular member 12 with one electrical connection of the heating element 22. The other electrical lead of the heating element 22 is an electrical connection through the insulating wire 27 with the metal prong 26, which in turn is in electrical contact with the metal contact plate 68. Electrical lead or connection 69 provides an electrical connection between the contact plate 68 and an electrical lead of the solenoid 35, the contact plate 68 is also in electrical connection with the lead 72 entering the casing 11.

The other electrical lead of the solenoid 35 is connected by an electrical lead or connection 71 with the fixed contact element 66. When the movable contact element 65 is moved over into electrical contact with the element 66, then the solenoid 35 is electrically connected through the element 65, the leaf spring 61, the bracket 60, the leaf spring 59, the element 58, and the element 57 (when the connection between elements 57 and 58 is closed by the finger switch 50) and hence with the incoming lead 73. The other electrical end of the solenoid 35 is electrically connected with the lead 72 through the electrical connection 69.

In the operation of my tool, the forward end of the metal tube 21 is placed adjacent to a soldered connection in such proximity as to melt the solder upon the energization of the heating element 22. Upon the leads 72 and 73 being connected to a suitable source of electrical energy and the press of the finger button 50, the heating element is energized. At this time, the thumb engaging member 51 is not moved so that the elements 64 and 65 are in electrical contact and subsequently all of the electrical energy goes through the heating element 22 and none through the solenoid 35. When the solder is sufficiently melted, then while keeping the finger element 50 depressed so as to maintain the contacts 57 and 58 in electrical connection, the operator's thumb moves the end of the arm 51 so as to swing the inner end of the arm 50 against the leaf spring 61, and thus to move the movable element 65 into electrical contact with the element 66 and out of electrical contact with the element 64. The electric current now by-passes the heating element 22 and instead flows through the solenoid 35 in the manner described. Upon energization of the solenoid 35, the piston 32 is immediately moved downwardly in the cylinder 31 and this draws or sucks air through the forward end of the tube 21 and inwardly of the cylinder 31. This rapid and sudden drawing or sucking action of the air around the forward end of the metal tube 21 and in the vicinity of the pool of molten metal causes the molten metal in the form of particles or droplets to move with the air in an axial direction through the bore of the tube 21 and into the forward chamber 17. The small droplets or particles of molten metal, such as solder, impinge upon the rearward wall of the solid portion 16 of the member 13 and collect upon that rearward wall within the chamber 17. The air drawn into the chamber 17 is vented or drawn through the two opposite slots 19-a, through the passageway 23, through the openings 15, through the bore 14, and through the inner bore of the tube 30 into the cylinder 31. Upon the removal of the molten solder as from a soldered connection, the arm 51 is released by the thumb of the operator as the contact element 65 is resiliently moved by the leaf spring 61 back into contact with the element 64 and out of contact with the element 66 to the positions illustrated in Figures 6 and 8. This de-energizes the solenoid 35 and the coil spring 34 again projects the piston upwardly into the cylinder and in a position for the next action for sucking or drawing air inwardly into the open forward end of the tool. When the solenoid is being operated, the heating element is de-energized. When the solenoid is not de-energized, the heating element will be energized as long as the finger element is depressed to close the contacts 57 and 58.

After use for a considerable period of time, there may be a collection of solder within the chamber 17 and against the end wall of the solid portion 16. This may be readily removed by raising the yoke 40 against the bias of the springs 45 and 46 to disengage the plate 24. The plate 24 and tube 12 are then moved axially to separate the tube 12 and parts carried thereby from the inner member 13, such as illustrated in Figure 2. Upon removal of the tubular member 12 so as to clear the forward end of the member 13, the hinged portion 19 may be flexed downwardly to the position as illustrated in Figure 7 and the droplets or solid solder or other fusible material may be readily shaken out of the chamber 17. In most instances, it will readily fall out but if not, it can be shaken or readily picked out of the chamber and from the end wall 16.

To reassemble, the hinged portion 19 is moved back into contact with the fixed portion 18 and the tubular member 12 is then moved rearwardly so as to fit over the inner member 13 to the position illustrated in Figure 1. The yoke 40 is then pulled against the bias of the springs 47 and 46 so as to be raised up and then downwardly to grasp and hold the plate 24 back against the rubber gasket 29 and to urge the prongs 25 and 26 into electrical contact with the contact plates 62 and 68.

My new improved tool provides a quick reliable and convenient way of melting fusible material, such as solder and also for the quick and convenient removal of fusible material, such as the solder from a soldered connection.

This disclosure includes the description contained in the appended claims as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool for melting and removing fusible material comprising in combination a hollow casing having an opening at its forward end, electrical heating means carried by the casing adjacent its forward end for melting of said material, expansible chamber means carried by said casing to draw air from said open end into said casing upon expansion of said chamber means, actuating means for expanding and contracting said chamber means, said actuating means including spring means and electric solenoid means operable in opposition to each other, trapping means in said casing for entrapping material melted by said heating means and drawn with air through the said open end into said casing upon expansion of said chamber means, electrical circuit means adapted to connect said heating means and said solenoid means with a source of electrical energy, and manually operable switch means for controlling the flow of current through said circuit means to said heating means, said switch means including a first switch arranged to control the flow of current to said heating means and a second switch arranged to control the flow of current ot said heating means and said solenoid means, said first and second swtiches and said circuit means being arranged to permit energization of said heating means without energization of said solenoid means and to de-energize said heating means upon energization of said solenoid means.

2. A tool for melting and removing fusible material comprising in combination a hollow member having an elongated portion, said elongated portion having an open forward end adapted to be positioned adjacent said fusible material, electric heating means carried by said hollow member adjacent said forward end for melting said material, expansible chamber means carried by said hollow member in communication through said hollow member with said open forward end to suck air through said open forward end inwardly of said hollow member, trapping means carried by said hollow member for entrapping material melted by said heating means and sucked into said hollow member with air by said expansible chamber means, actuating means carried by said hollow member for expanding and contracting said expansible chamber means, electric solenoid means and opposed resilient means for operating said actuating means, electrical connecting means carried by said hollow member for connecting said heating means and said solenoid means with a source of electrical energy, and switch means carried by said hollow member for selectively controlling the energization of said heating means and said solenoid means.

3. A tool as claimed in claim 2 and in which said switch means includes two switches and in which said electrical connecting means, said heating means, said solenoid means and said two switches are electrically interconnected to provide that closing of one switch connects said heating means with said electrical connecting means for energization of the heating means and that closing of a second switch connects said solenoid means with said electrical connecting means for energization of said solenoid means and concurrently disconnects said heating means with said electrical connecting means for de-energization of said heating means during energization of said solenoid means.

4. A tool for melting and removing fusible material comprising the combination of supporting means, electrical heating means carried by the supporting means for melting said fusible material, expansible chamber means carried by the supporting means for sucking air and with said air the said fusible material while melted by the heating means, entrapping means carried by the supporting means for entrapping the said fusible material sucked with the said air, electrical solenoid means carried by said supporting means for actuating said expansible chamber means, electric connecting means for electrically connecting said heating means and solenoid means with a source of electric energy, and switch means for selectively connecting said heating means and selectively connecting said solenoid means with said connecting means to selectively energize said heating means and said solenoid means.

5. In a device for melting and removing fusible material and having electric heating means for melting said material, air-sucking means for sucking air ladened with particles of melted fusible material, and trapping means for entrapping said particles sucked with said air, the improvement of electric solenoid means connected to said air-sucking means for actuating said air-sucking means, electrical connecting means in electrical connection with said electric heating means and with said electric solenoid means, said heating means and said solenoid means being connected in parallel by said connecting means, said connecting means being adapted to be electrically connected with a source of electrical energy, first switch means for controlling the supply of current through the connecting means to said heating means and said solenoid means, and second switch means arranged in series with said first switch means for diverting current from said heating means to said solenoid means for actuating the same.

6. The combination of electric heating means for melting fusible material at a locale, suction means for sucking air and melted fusible material from said locale, trapping means for entrapping the fusible material sucked by said suction means, electric solenoid means for actuating said suction means, electric connecting means for connecting said heating means and solenoid means in parallel with each other and to a source of electrical energy, a first switch for controlling the flow of current through the connecting means from said source to said heating means and said solenoid means, and a second switch in series with said first switch for selectively directing the flow of current through the connecting means from said source alternately to said heating means and said solenoid means.

7. In a tool having electric heating means for melting fusible material, air suction means for withdrawing said fusible material upon being melted, and trapping means for entrapping the fusible material withdrawn by said air suction means, the improvement of electric solenoid means for energizing said air suction means, electric connecting means connecting said heating means and solenoid means in parallel with a source of electrical energy, and switch means in said connecting means for selectively connecting said heating means and solenoid means alternately with said source.

8. In a tool for melting and removing fusible material, said tool having a housing, a first tube extending from said housing and a second tube detachably mounted to said housing and concentrically disposed about said first tube, the combination of a first abutting member carried by said housing adjacent said first tube, a second abutting member carried by said second tube adjacent an end thereof, said abutting members being adapted to be aligned upon the positioning of the second tube concentric with said first tube, a yoke member engageable with said second abutting member to hold the second abutting member against the first abutting member, a pair of arms connected to said yoke member to carry the same, said arms being mounted to said housing to permit pivotal swinging of said arms relative to the housing and to permit movement of the arms longitudinally of their respective axes relative to the housing, and spring means biasing said arms relative to the housing for urging the arms in a direction to move the yoke member toward the first abutting member, said yoke member resiliently movable on said arms under bias by said spring means being adapted to detachably hold said second abutting member to said housing and said second tube in position about said first tube.

References Cited in the file of this patent

UNITED STATES PATENTS

| | | |
|---|---|---|
| 538,695 | Osborne et al. | May 7, 1895 |
| 1,106,682 | Schirra | Aug. 11, 1914 |
| 1,120,377 | Dusinberre | Dec. 8, 1914 |
| 1,789,694 | Beman | Jan. 20, 1931 |
| 2,297,025 | Russell | Sept. 29, 1942 |
| 2,609,778 | Bleam et al. | Sept. 9, 1952 |
| 2,826,667 | Brillinger | Mar. 11, 1958 |

FOREIGN PATENTS

| | | |
|---|---|---|
| 516,676 | Canada | Sept. 20, 1955 |